United States Patent
Wilenski

(10) Patent No.: US 9,939,664 B2
(45) Date of Patent: Apr. 10, 2018

(54) HIGH TEMPERATURE RANGE AND HIGH STRAIN RANGE TRANSPARENT COMPOSITES BASED ON MATRICES HAVING OPTICALLY TUNABLE REFRACTIVE INDICES

(71) Applicant: The Boeing Company, Chicago, IL (US)

(72) Inventor: Mark S. Wilenski, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 236 days.

(21) Appl. No.: 14/566,440

(22) Filed: Dec. 10, 2014

(65) Prior Publication Data
US 2016/0349542 A1    Dec. 1, 2016

(51) Int. Cl.
| | | |
|---|---|---|
| G02F 1/01 | (2006.01) | |
| G02F 1/19 | (2006.01) | |
| G02B 1/00 | (2006.01) | |
| B32B 5/26 | (2006.01) | |
| B23B 5/26 | (2006.01) | |

(52) U.S. Cl.
CPC .......... *G02F 1/0126* (2013.01); *B32B 5/26* (2013.01); *G02B 1/00* (2013.01); *G02F 1/19* (2013.01); *B32B 2262/02* (2013.01); *B32B 2262/101* (2013.01); *B32B 2307/418* (2013.01)

(58) Field of Classification Search
CPC ........... G02B 5/20; G02B 5/23; G02F 1/0121; G02F 1/0126; H04B 10/2507–10/2572; B32B 5/00–5/32

USPC .......................................................... 359/244
See application file for complete search history.

(56) References Cited

U.S. PATENT DOCUMENTS

| | | | |
|---|---|---|---|
| 4,820,016 A * | 4/1989 | Cohen ................ | G01K 11/3213 359/241 |
| 4,963,448 A | 10/1990 | Ichimura | |
| 8,559,779 B2 | 10/2013 | Kozar et al. | |
| 2007/0077015 A1 | 4/2007 | Aoki | |
| 2009/0181211 A1 | 7/2009 | Lang et al. | |
| 2013/0337222 A1 | 12/2013 | Wilenski et al. | |
| 2015/0036204 A1 * | 2/2015 | Branda .................... | G02B 5/23 359/244 |

OTHER PUBLICATIONS

"Azobenzene." Wikipedia. Wikimedia Foundation, Apr. 23, 2012. Web. Sep. 21, 2016.*
Wikipedia, "Abbe Number," retrieved Dec. 7, 2014.
EPO, European Search Report, dated May 16, 2016.
Canadian Patent Office, Office Action, Appl. No. 2,900,780, dated Nov. 23, 2016.
Canadian Patent Office, Office Action, Appl. No. 2,900,780, dated Oct. 18, 2017.

* cited by examiner

*Primary Examiner* — Zachary Wilkes

(57) ABSTRACT

A system may include a composite structure and a light source. The composite structure may include a matrix having a matrix refractive index, a plurality of fibers embedded in the matrix, and a light-reactive material in the matrix. The light source may be capable of emitting light of an activation wavelength that induces a reaction in the light-reactive material causing a change in the matrix refractive index.

27 Claims, 7 Drawing Sheets

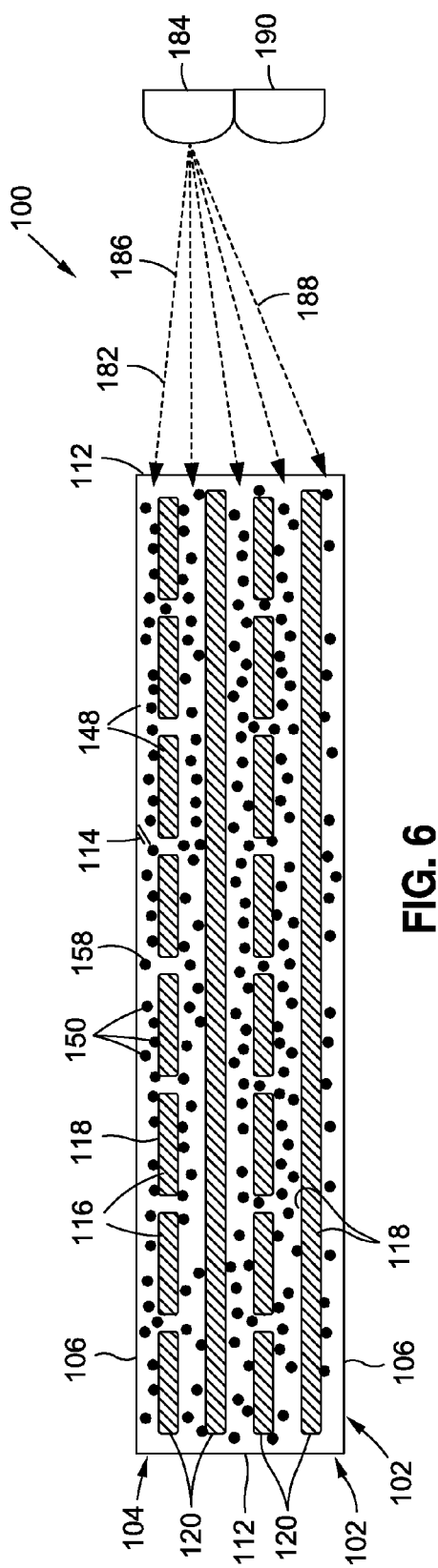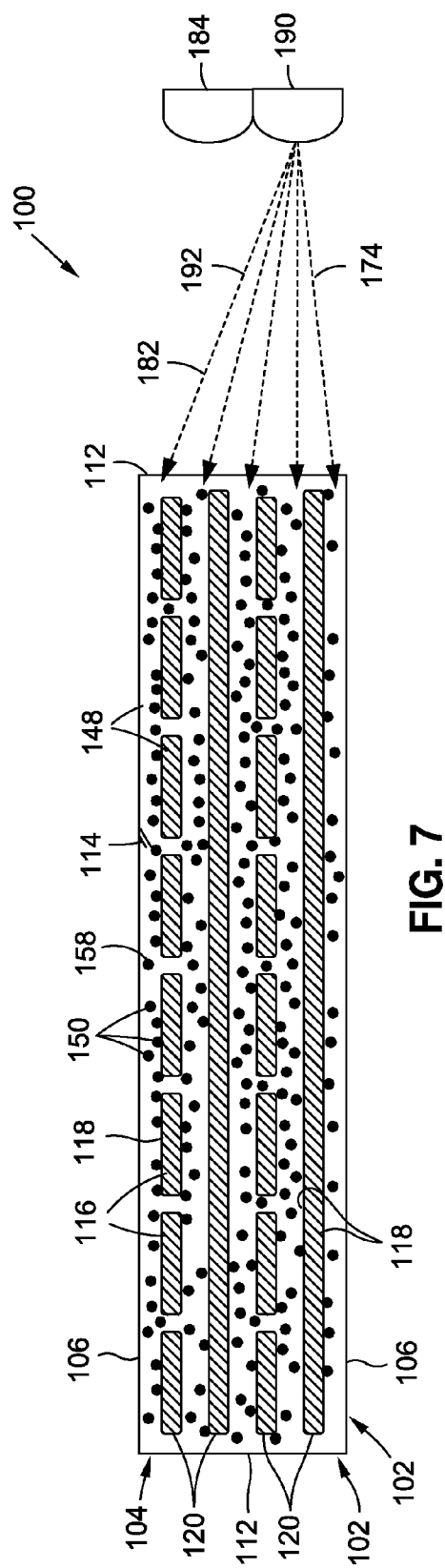

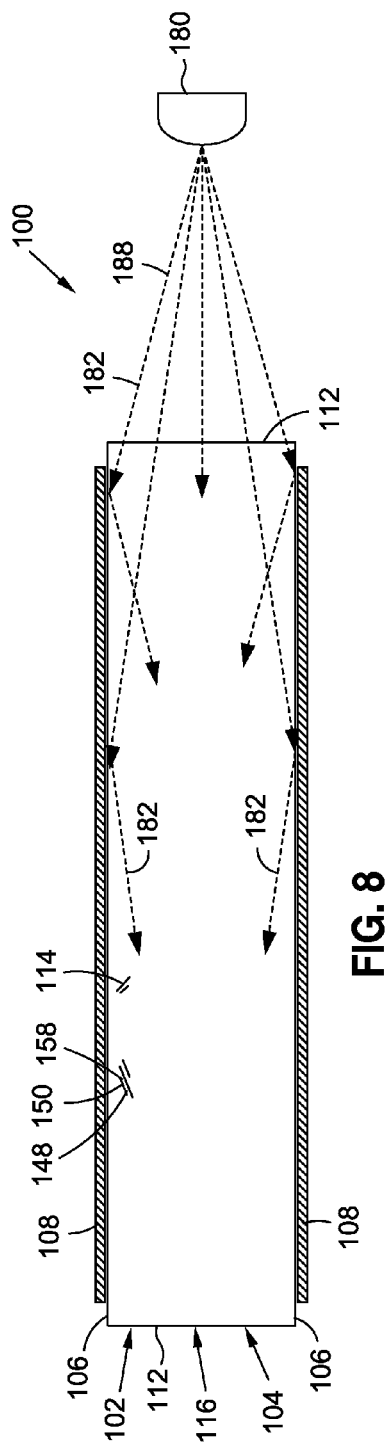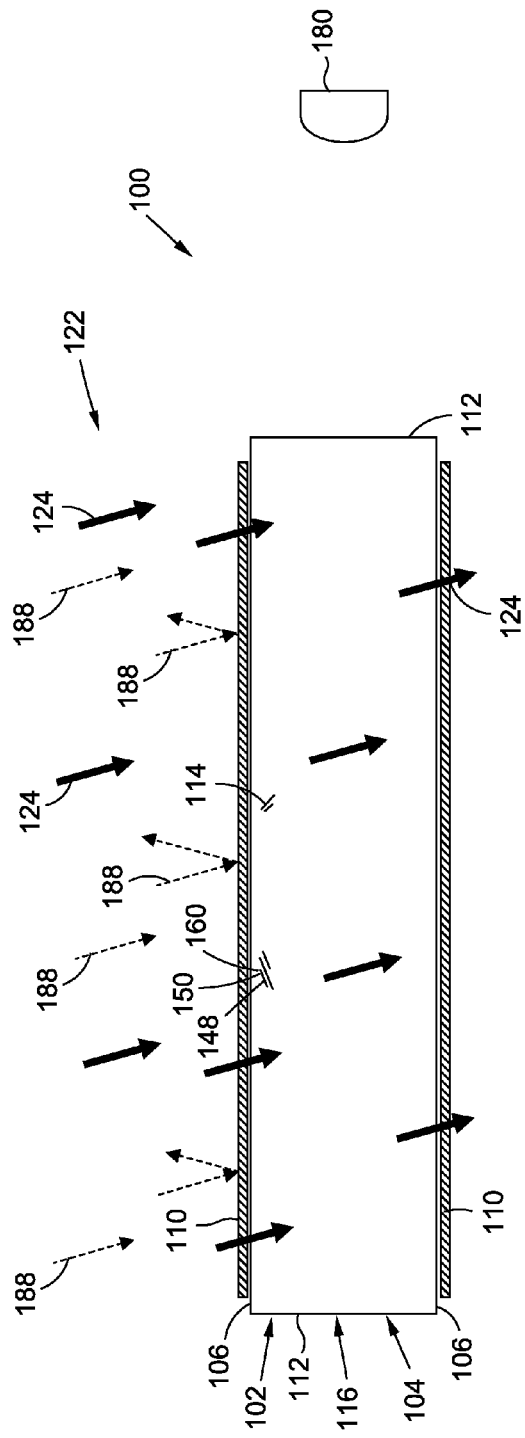

HIGH TEMPERATURE RANGE AND HIGH STRAIN RANGE TRANSPARENT COMPOSITES BASED ON MATRICES HAVING OPTICALLY TUNABLE REFRACTIVE INDICES

FIELD

The present disclosure relates generally to composites and, more particularly, to controlling the transparency of fiber-reinforced composite structures.

BACKGROUND

Glass is widely used as a transparency in a variety of applications due to its superior optical qualities. For example, monolithic panels of glass are commonly used as glazing material or as architectural material for buildings. Monolithic glass panels are also commonly used as transparencies in a variety of vehicular applications. Unfortunately, glass is a relatively dense material and is also relatively brittle such that relatively large thicknesses are required to provide a glass panel with sufficient strength to resist cracking under load.

In an attempt to avoid the weight penalties associated with monolithic glass panels, transparencies may also be fabricated of polymeric material. For example, monolithic panels may be formed of transparent polymers such as acrylic (e.g., Plexiglas™) which is less dense than glass and which possesses favorable optical properties. Unfortunately, acrylic has relatively low strength properties making it unsuitable for applications where high strength is required.

In consideration of the weight penalties associated with monolithic glass panels and the strength limitations associated with monolithic polymeric panels, manufacturers have fabricated transparencies from polymeric materials reinforced with fibers to enhance the strength and impact resistance of the transparency. Unfortunately, certain environmental factors may have an undesirable effect on the optical characteristics of a polymeric material reinforced with fibers. For example, changes in temperature may reduce the optical quality of the fiber-reinforced polymeric material.

As can be seen, there exists a need in the art for a system and method for controlling the optical quality of a fiber-reinforced transparency with changes in temperature.

BRIEF SUMMARY

The above-described needs associated with transparent composite articles are specifically addressed and alleviated by the present disclosure which, in an embodiment, provides a system that may include a composite structure and a light source. The composite structure may include a matrix having a matrix refractive index, a plurality of fibers embedded in the matrix, and a light-reactive material included with the matrix and/or the fibers. The light source may be capable of emitting light of an activation wavelength that induces a reaction in the light-reactive material causing a change in the matrix refractive index In a further embodiment, disclosed is a system including a composite panel having opposing outer surfaces and a side edge. The composite panel may include a substantially optically-transparent matrix having a matrix refractive index, and a plurality of substantially optically-transparent fibers embedded in the matrix. The fibers and/or the matrix may include a photosensitive chromophore. The light source may be configured to emit light of a wavelength onto or toward the side edge. The wavelength may induce a reaction in the chromophore causing a change in the matrix refractive index.

In a further embodiment, disclosed is a method of adjusting the refractive index of a matrix of a composite structure. The method may include emitting light of an activation wavelength from a light source toward a composite structure containing a matrix having a matrix refractive index and a plurality of fibers embedded in the matrix and having a fiber refractive index. The matrix and/or the fibers may include a light-reactive material. The method may include inducing a reaction in the light-reactive material in response to the activation wavelength incident on the light-reactive material, and changing the matrix refractive index in response to the reaction in the light-reactive material.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein:

FIG. 6 is a sectional view of a system containing a first light source and a second light source and illustrating the first light source emitting light of a first wavelength toward a side edge of the composite structure;

FIG. 7 is a sectional view of the system illustrating the second light source emitting light of a second wavelength toward a side edge of the composite structure;

FIG. 8 is a sectional view of a system having a coating on the outer surfaces of the composite structure for internally reflecting light from the light source along a length and/or width of the interior of the composite structure;

FIG. 9 is a sectional view of a system having a filter on the outer surfaces of the composite structure to prevent ambient light of the activation wavelength from passing through the composite structure and activating the chromophores;

DETAILED DESCRIPTION

Figure 1:
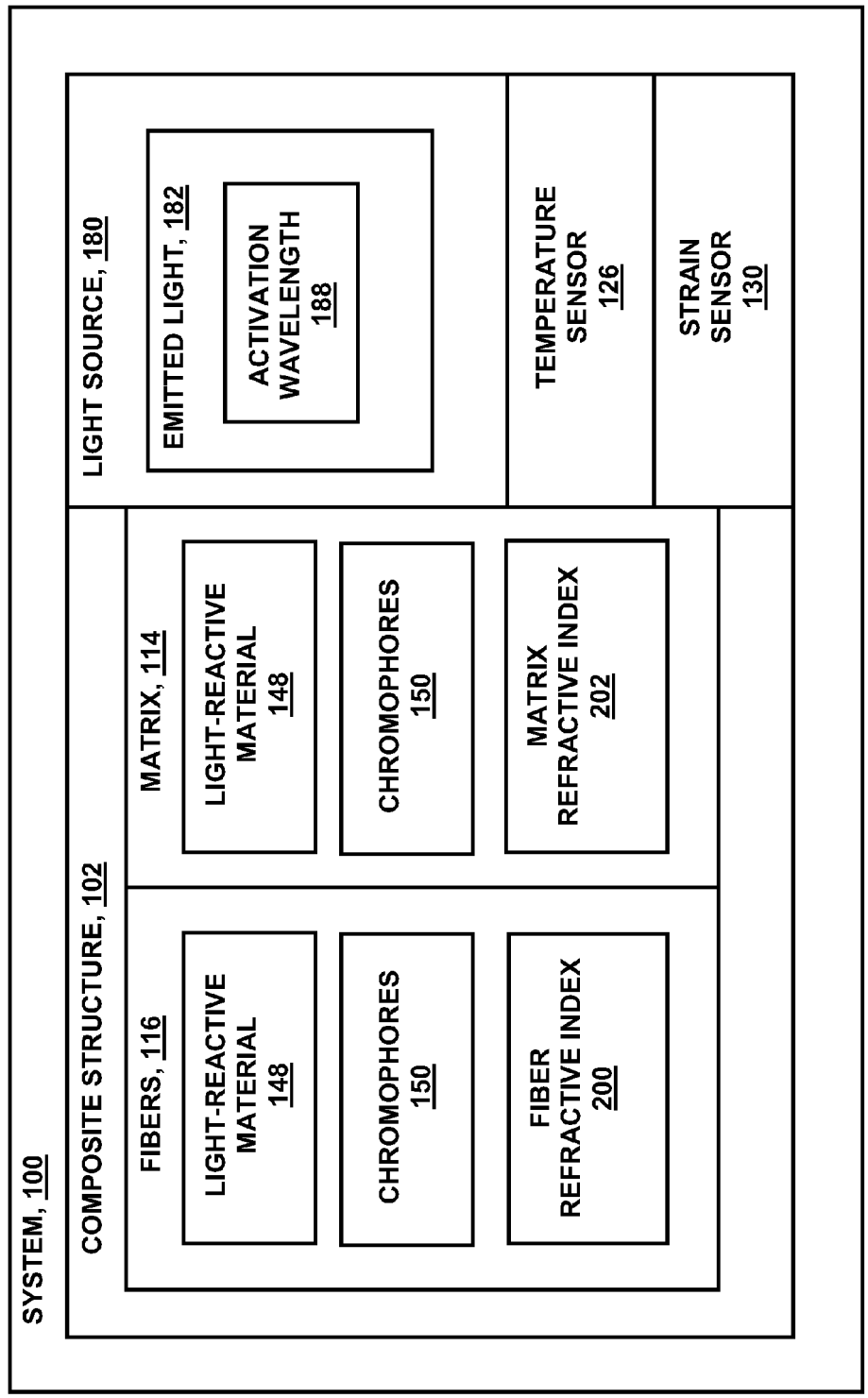
FIG. 1 is a block diagram of a system including a fiber-reinforced composite structure containing photo-sensitive chromophores included within the matrix and/or within the fibers, and including a light source for emitting an activation wavelength that induces a reaction in the chromophores causing a change in the refractive index of the matrix.

Referring now to the drawings wherein the showings are for purposes of illustrating preferred and various embodiments of the disclosure, shown in FIG. 1 is a block diagram of a system 100 including a composite structure 102 and a light source 180 for emitting light 182 toward the composite structure 102. The composite structure 102 may be comprised of a polymer matrix 114 and a plurality of reinforcing fibers 116 embedded in the matrix 114. The fibers 116 may have a fiber refractive index 200. The matrix 114 may have a matrix refractive index 202. Advantageously, the matrix 114 and/or the fibers 116 may include a light-reactive material 148 which may be sensitive to one or more wavelengths of light 182 that may be emitted by the light source 180 to induce a reaction in the light-reactive material 148 causing a change in the refractive index of the matrix 114. In one example, the matrix 114 and/or the fibers 116 may include photo-sensitive chromophores 150 which may be sensitive to one or more wavelengths of light 182 that may be emitted by the light source 180 to induce a reaction in the chromophores 150 causing a change in the refractive index of the matrix 114. In any of the embodiments disclosed herein, the matrix 114 and/or the fibers 116 may include one or more types of light-reactive material 148, and/or the matrix 114 and/or the fibers 116 may include one or more types of chromophores 150. In some examples, the matrix 114 and/or the fibers 116 may include light-reactive material 148, and may not include chromophores 150.

The light source 180 may be configured to emit light 182 that induces a reaction in the light-reactive material 148 and/or the chromophores 150 causing a refractive index change in the matrix 114 as a means to compensate or adjust for an environmentally-induced change in the fiber refractive index 200. For example, a photo-induced change in the matrix refractive index 202 may compensate for thermally-induced changes in the fiber refractive index 200 that may occur as a result of changes in the temperature of the composite structure 102. In another example, a photo-induced change in the matrix refractive index 202 may compensate or adjust for mechanically-induced changes in the fiber refractive index 200 that may occur as a result of mechanical strain of the composite structure 102 under static and/or dynamic loading.

The system 100 may optionally include one or more sensors (e.g. see FIG. 3) configured to sense environmentally-induced changes in the composite structure 102. For example, the system 100 may include one or more temperature sensors 126 configured to sense the temperature of the composite structure 102, and/or the system 100 may include one or more strain sensors 130 to sense mechanical strain of the composite structure 102. Such sensors may generate sensor signals 128, 132 (FIG. 3) that may be transmitted to the light source 180 to allow the light source 180 to emit light 182 in a manner to induce a reaction in the light-reactive material 148 and/or the chromophores 150 to cause a change in the matrix refractive index 202 by an amount related to or proportional to the sensed environmental change in the composite structure 102.

For examples where the composite structure 102 is formed of matrix 114 and fibers 116 that are substantially optically transparent within a wavelength band of interest such as the infrared spectrum and/or the visible spectrum for a given temperature or temperature range, the change in the matrix refractive index 202 induced by the light-source-emitted wavelength incident on the light-reactive material 148 and/or the chromophores 150 may compensate or adjust for thermally-induced changes and/or mechanically-induced changes in the matrix refractive index 202 as a means to increase the respective temperature range and/or strain range over which the composite structure 102 remains substantially optically transparent relative to a composite structure that lacks chromophores. As indicated above, temperature change in a fiber-reinforced polymer matrix composite structure 102 may reduce the optical quality of the composite structure 102 due to differences in the refractive index n of the matrix 114 relative to the fibers 116. Although the fiber 116 material and the matrix 114 material may optionally be selected to have approximately the same or substantially equivalent refractive indices n (e.g., within approximately 10 percent of one another) for a given match point temperature T for a given wavelength λ of incident light when the chromophores 150 are in an unactivated state 160 (FIG. 4), the difference in temperature coefficient of refractive index $dn(λ,T)/dT$ of the fibers 116 and matrix 114 may result in a change (e.g., an increasing difference) in the refractive indices of the two materials as the temperature of the composite structure 102 diverges from (e.g., increases or decreases relative to) the match point temperature, as discussed in greater detail below.

Advantageously, the light-reactive material 148 and/or the chromophores 150, when activated or further excited by the light source 180, provide a means for tuning the matrix refractive index 202 to substantially match or closely approximate (e.g., within 10 percent and, more preferably, within 0.1 percent) the fiber refractive index 200 as the matrix refractive index 202 changes due to environmental factors acting on the composite structure 102 such as changes in temperature and/or mechanical strain of the composite structure 102. For example, the light source 180 may be configured to emit one or more wavelengths to initially activate or to further excite the light-reactive material 148 and/or the chromophores 150 in a manner maintaining the matrix refractive index 202 within less than approximately 10 percent of the fiber refractive index 200 for ambient light 122 (FIG. 9) within the wavelength band of interest and for a given temperature range of the composite structure 102. In one embodiment, the light source 180 may be configured to emit one or more wavelengths of light 182 to activate and/or further excite the chromophores 150 in a manner maintaining the matrix refractive index 202 within approximately 3 percent of the fiber refractive index 200 within the infrared spectrum and/or visible spectrum for a temperature range of the composite structure 102 of from approximately −65° F. to approximately 220° F. In some examples, the light source 180 may be configured to emit one or more wavelengths of light 182 to activate and/or further excite the chromophores 150 in a manner maintaining the matrix refractive index 202 within approximately 0.1 percent of the fiber refractive index 200 within the infrared spectrum and/or the visible spectrum.

For a composite structure 102 that is substantially optically transparent within a wavelength band of interest, activation of the light-reactive material 148 and/or the chromophores 150 by the light source 180 may increase the range over which the composite structure 102 may remain substantially optically transparent. For example, a composite structure 102 that is substantially optically transparent in the visible spectrum and/or the infrared spectrum for a given temperature or temperature range, activation of the light-reactive material 148 and/or the chromophores 150 may allow the composite structure 102 to maintain a relatively high degree of optical transmission and low distortion of ambient light 122 through the composite structure 102, and may effectively expand the useful operating temperature or temperature range over which the composite structure 102 remains substantially optically transparent. However, in other examples, the light-reactive material 148 and/or the chromophores 150 may be activated by a light source 180 to render an otherwise optically transparent composite structure 102 translucent, such as for privacy purposes.

Figure 2:
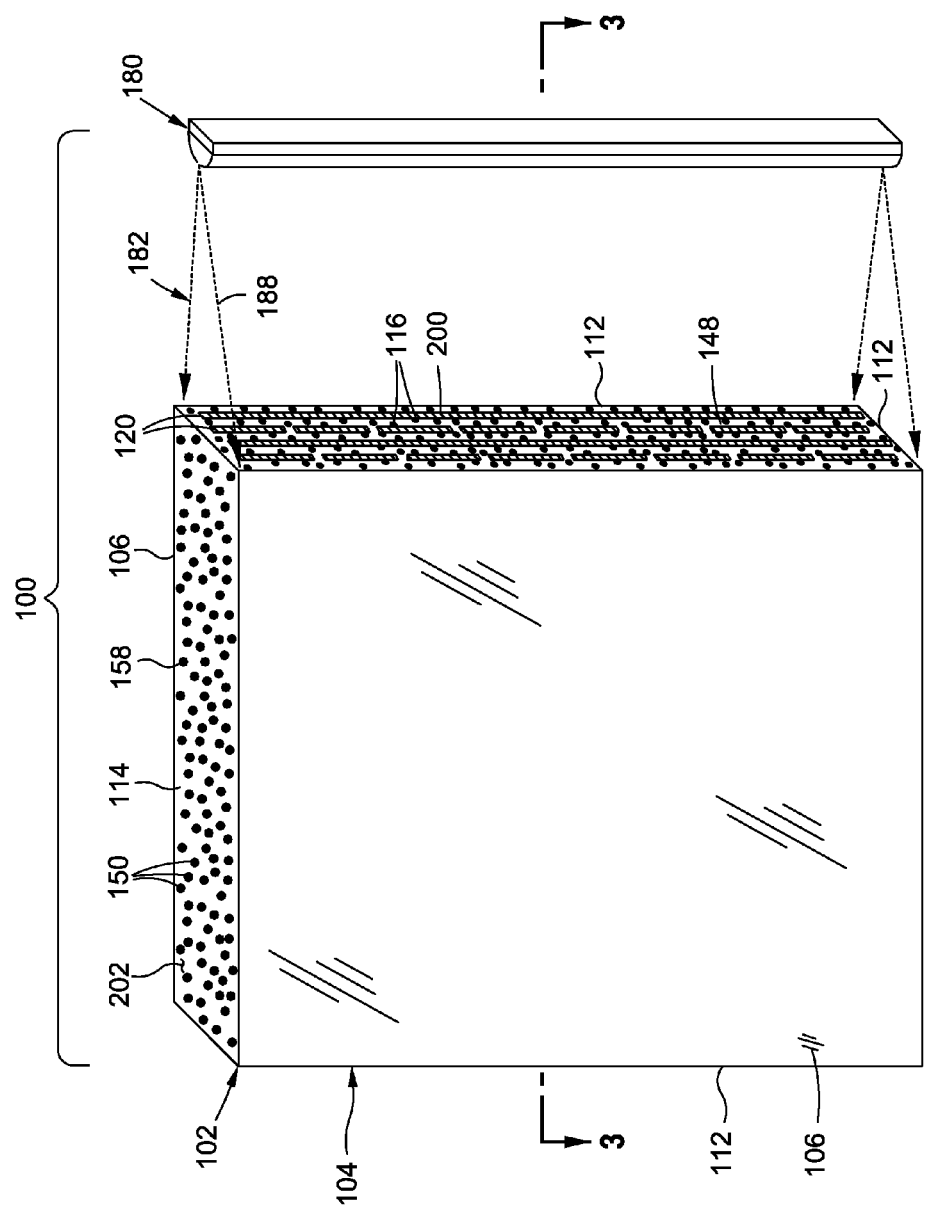
FIG. 2 is a perspective view of an example of a composite structure comprising a plurality of reinforcing fibers embedded within a matrix and including chromophores which are schematically represented as individual particles, and wherein the matrix has a matrix refractive index and the fibers have a fiber refractive index and further illustrating a light source emitting light toward a side edge of the composite structure for inducing a reaction in the chromophores.

FIG. 2 shows an example of a system 100 including a fiber-reinforced polymer matrix composite structure 102 configured as a panel 104 having opposing outer surfaces 106 and side edges 112 along the perimeter of the composite structure 102. In some examples, the composite structure 102 may be configured as a transparency such as a windshield, a window, a canopy, a membrane, or a structural panel of a vehicle such as a land vehicle, an air vehicle such as an aircraft, and/or a space vehicle. Although shown as a panel 104 having a generally square or rectangular shape, the composite structure 102 may be provided in any one of a variety of different sizes, shapes, and configurations, and may include generally flat or planar outer surfaces 106, as shown in FIG. 2, or the composite structure 102 may include one or more compound curvature outer surfaces (not shown). In some examples, the composite structure 102 may be configured as a transparency, an architectural panel, a structural panel, and/or a non-structural article of a building or other structure. However, the composite structure 102 may be configured for use in any application, system, subsystem, structure, apparatus and/or device, without limitation.

Figure 4:
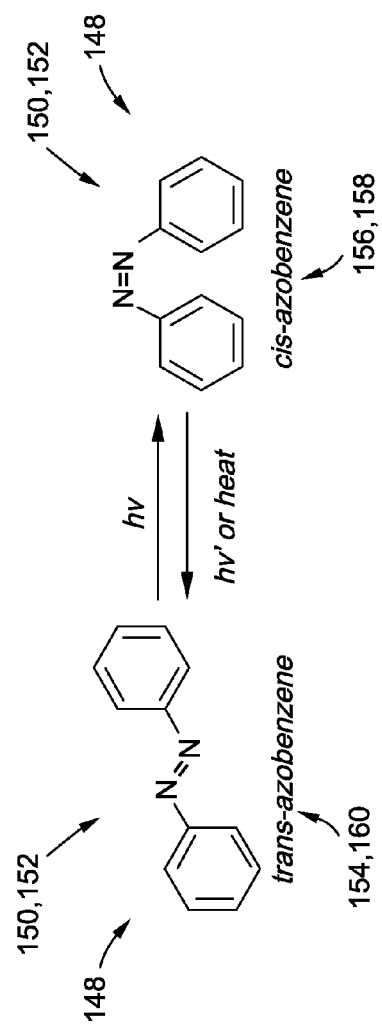
FIG. 4 is an example of a chromophore configured as an azobenzene molecule shown in an unactivated state (left-hand side) and in an activated state (right-hand side) in response to an activation wavelength incident on the azobenzene molecule.

The system 100 may further include one or more light sources 180 configured to emit light 182 toward one or more side edges 112 or side faces of the composite structure 102 for the purpose of inducing a reaction in the light-reactive material 148 and/or the chromophores 150 included in the matrix 114 and/or the fibers 116. Any one or more of the light sources 180 may be provided as a light emitting diode (LED), a laser, or other type of lighting device capable of emitting a wavelength causing a reaction in the light-reactive material 148 and/or the photosensitive chromophores 150. Although FIG. 2 illustrates a single light source 180 positioned in spaced, parallel relation to one side edge 112 of the panel 104, the system 100 may include light sources 180 on any one or more of the side edges 112 or side faces of a composite structure 102. In addition, one or more light sources 180 may be mounted in abutting contact with one or more side edges 112 or side faces of the composite structure 102 such that light 182 emitted by the light source 180 enters the composite structure 102 without passing through another medium (e.g., air) prior to entering the composite structure 102. For example, one light source 180 may be positioned adjacent to one side edge 112 of a panel 104, and another light source 180 may be positioned on an opposite side edge 112 of the panel 104. One or more light sources 180 may be configured to emit light 182 of an activation wavelength 188 or a wavelength band that induces a reaction in the light-reactive material 148 and/or the light-reactive material 148 and/or the chromophores 150 to cause a transition in the light-reactive material 148 and/or the chromophores 150 from an unactivated state 160 (FIG. 4) to an activated state 158 (FIG. 4). The transition of the light-reactive material 148 and/or the chromophores 150 from an unactivated state 160 to an activated state 158 may induce a change in the matrix refractive index 202.

In another example, the system 100 may include one or more light sources 180 that may be configured to emit light 182 of a deactivation wavelength 194 or band of wavelengths that cause the chromophores 150 to transition from the activated state 158 to the unactivated state 160. In some examples, a light source 180 may be configured to emit light 182 of a deactivation wavelength 194 that either partially or completely reverses the change in the matrix refractive index 202 caused by the activation wavelength 188. In still other examples, a single light source 180 may be configured to emit light 182 of an activation wavelength 188 (FIG. 6) or band of wavelengths, and the single light source 180 may also be configured to emit light 182 of one or more deactivation wavelength 194 (FIG. 7) or band of wavelengths.

Figure 3:
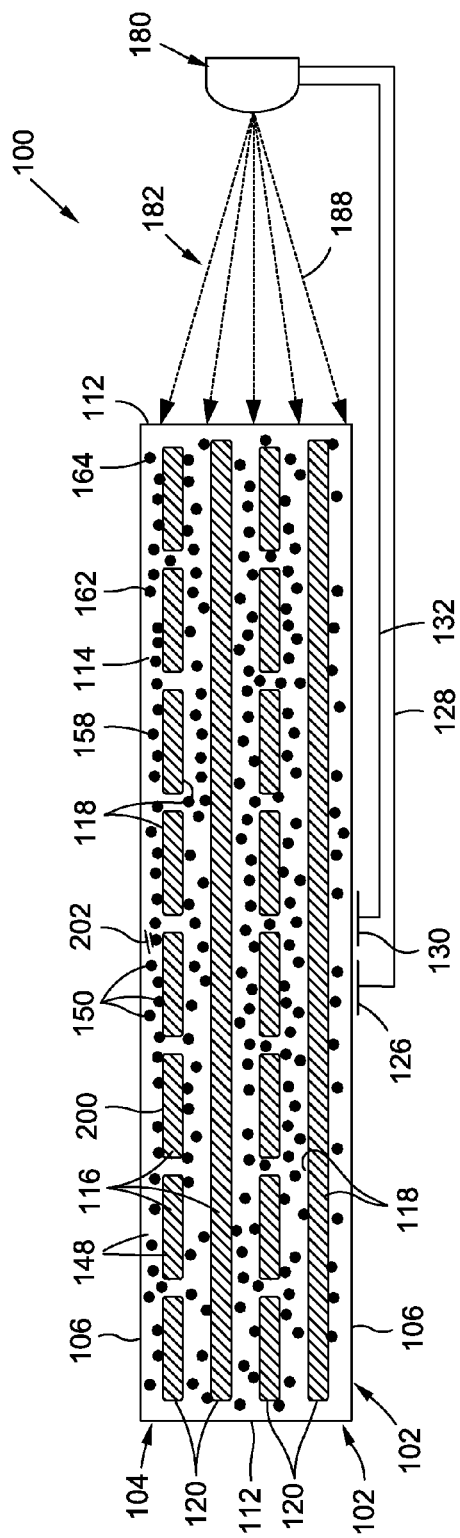
FIG. 3 is a sectional view of the system of FIG. 2 and illustrating fibers, matrix, and chromophores, and further illustrating a temperature sensor, a strain sensor, and or a transparency sensor optionally mounted on the composite structure for feedback to the light source for adjusting the light emitted by the light source to adjust for changes in temperature, mechanical strain, and/or level of transparency of the composite structure.

FIG. 3 is a sectional view of the composite structure 102 and the light source 180 of FIG. 2. The light source 180 is shown emitting light 182 toward a side edge 112 of the composite structure 102 which may include reinforcing fibers 116 embedded within the polymer matrix 114 and including light-reactive material 148 and/or the chromophores 150 in the matrix 114 and/or in the fibers 116. The reinforcing fibers 116 may be arranged in layers 120 within the matrix 114. In some examples, the light-reactive material 148 and/or the chromophores 150 may be included within the fibers 116 themselves. The composite structure 102 may comprise a composite laminate formed of layers 120 or plies of fibers 116. The fibers 116 may provide structural reinforcement for the polymer matrix 114 and may thereby improve the mechanical performance of the composite structure 102. For example, the reinforcing fibers 116 may improve the specific stiffness and/or the specific strength of the composite structure 102 due to the relatively high tensile strength and modulus of elasticity of the fibers 116. Materials from which the fibers 116 and matrix 114 may be formed include, without limitation, any suitable thermoplastic or thermosetting material. Thermoplastic material may comprise at least one of the following: fluorocarbons, polyamides, polyethylenes, polypropylenes, polycarbonates, polyurethanes, polyetheretherketone, polyetherketoneketone, and polyoxymethylene. Thermosetting material may comprise at least one of the following: polyurethanes, phenolics, polyimides, bismaleimides, polyesters, and epoxy. In one example, the fibers 116 may be glass fibers and/or polymeric fibers.

In some examples, the fibers 116 may be substantially optically transparent within a wavelength band of interest such as the infrared spectrum and/or the visible spectrum. In the example shown, the fibers 116 may be substantially continuous or unidirectional, and may have an elongated cross-sectional shape. However, the fibers 116 may be provided in a rounded cross-sectional shape or in any one of a variety of other cross-sectional shapes. For example, one or more fibers 116 may have a cross-sectional shape of a polygon, a quadrilateral, a square, a rectangle and any other suitable cross-sectional shape. Furthermore, the system 100 and method of the present disclosure is not limited to continuous fibers 116. For example, a composite structure 102 may include continuous fibers, chopped fibers, randomly-oriented fibers, whiskers, particulates, and other fiber arrangements.

The elongated cross-sectional shape of the fibers 116 may include an opposing pair of substantially planar fiber faces 118 which may be oriented substantially parallel to each other. The planar fiber faces 118 of one fiber 116 may also be oriented parallel to the planar fiber faces 118 of other fibers 116 in the composite structure 102. In some examples, the planar fiber faces 118 may be oriented substantially parallel to the outer surfaces 106 of the composite structure 102 to enhance the optical performance of the composite structure 102. The substantially planar, parallel fiber faces 118 and outer surfaces 106 may minimize the scattering of light that may otherwise occur when light passes through a curved surface. In an embodiment, the elongated shape of the fibers 116 may be provided in a relatively high aspect ratio defined as the ratio of fiber width to fiber thickness. In some examples, the aspect ratio may vary from approximately three to approximately 500, although the fiber cross section may have an aspect ratio of any value. The fiber thickness between the planar fiber faces may be in the range of from approximately 5 microns to approximately 5000 microns, although other fiber thicknesses are contemplated.

In FIG. 3, the fibers 116 are shown as unidirectional fibers 116 with the fibers 116 in each layer 120 being oriented generally parallel to one another. The fibers 116 in the composite structure 102 are shown arranged in a cross-ply configuration wherein the fibers 116 in one layer 120 are oriented perpendicularly relative to the fibers 116 in other layers 120. However, the fibers 116 may be oriented in any one of a variety of angles (e.g., 15°, 22.5°, 45°, 60°, etc.) relative to the fibers 116 of other layers 120 in the composite structure 102, and are not limited to a cross-ply configuration shown. Furthermore, the fibers 116 in any one of the layers 120 may be oriented in non-parallel relation to one another. In one example, one or more of the layers 120 may include woven cloth arrangement. Even further, one or more of the layers 120 may include steered fibers (not shown) that curve along an in-plane direction of the layer. Although the composite structure 102 is shown as having four (4) layers 120 of fibers 116, any number of layers 120 may be provided. For example, a composite structure 102 may contain a single layer 120 of fibers 116 or tens or more of the layers 120 of fibers 116.

FIG. 3 further illustrates sensors configured to sense one or more environmental parameters of the composite structure 102. Each one of the sensors may be communicatively connected to a light source 180. One or more sensors may be mounted to the composite structure 102 such as to one or both of the outer surfaces 106. Sensors may also be internally embedded within the composite structure 102. Each sensor may transmit to the light source 180 a sensor signal representative of one or more environmental parameters of the composite structure 102. The light source 180 may be configured to regulate the emitted light 182 in response to one or more sensor signals, and induce or alter a reaction in the chromophores 150 in a manner causing a change in the refractive index of the matrix 114.

For example, in response to a sensor signal, the light source 180 may emit light 182 of a wavelength and/or intensity that induces a reaction in the light-reactive material 148 and/or the chromophores 150 in such a manner to change the matrix refractive index 202 by an amount that maintains the same level of optical transparency of the composite structure 102 relative to a baseline transparency level of the composite structure 102. The baseline transparency level may be described as the level of transparency of the composite structure 102 at a baseline temperature such as room temperature. In another example, the baseline transparency level may be described as the level of transparency of the composite structure 102 at a match point temperature where the refractive indices of the matrix 114 and fibers 116 are substantially equivalent for a given wavelength. For example, the baseline transparency level may be the transparency level of the composite structure 102 within the visible spectrum at room temperature and at zero mechanical load (e.g., zero strain) on the composite structure 102.

In one example, the light source 180 may be activated upon receiving a temperature signal 128 representing a change in the temperature of the composite structure 102 exceeding a predetermined threshold temperature such as a match point temperature (see e.g., FIG. 5), or exceeding a threshold temperature change. In another example, the light source 180 may be activated upon receiving a strain signal 132 indicating that the composite structure 102 is subject to mechanical strain in response to a mechanical load to which the composite structure 102 may be subjected, relative to a predetermined threshold strain level, or relative to a non-loaded state (e.g., zero strain) of the composite structure 102. In some examples, the light source 180 may emit light 182 of an initial activation wavelength 188 upon receiving a sensor signal. In other examples, the light source 180 may already be emitting light 182 of an activation wavelength 188, and upon receiving a sensor signal indicating a further change in an environmental parameter (e.g., temperature, strain) of the composite structure 102, the light source 180 may alter the emitted light 182 in a manner to compensate or adjust for additional environmentally-induced changes in the matrix refractive index 202 so that the matrix refractive index 202 is maintained substantially equivalent to the fiber refractive index 200 (e.g., within 10 percent or, more preferably within 0.1 percent).

In still further examples, the system 100 may include one or more transparency sensors (not shown) configured to sense a level of transparency of the composite structure 102 as a whole relative to a baseline transparency level of the composite structure 102 at a given temperature (e.g., (e.g., substantially 100 percent optically transparent in the visible spectrum at room temperature). Such transparency sensors may transmit signals representative of the transparency level, and the light source 180 may receive the signals and may alter the emitted light 182 in a manner to compensate or adjust for the change (e.g., a reduction) in transparency level such that the matrix refractive index 202 is maintained at a value relative to the fiber refractive index 200 to restore or maintain the composite structure 102 at the baseline transparency level. In this regard, the system 100 may include one or more sensors (e.g., temperature sensors 126, strain sensors 130, transparency level sensors) which may cooperate with one or more light sources 180 to simply apply whatever change is required to the light 182 emitted by the light source 180 to maintain maximum optical transparency of the composite structure 102 or maintain the optical transparency within a predetermined range (e.g., within 10 percent) of the baseline transparency level), regardless of the cause of the environmentally-induced change in the fiber refractive index 200.

For example, a temperature sensor 126 may sense an increase in the temperature of the composite structure 102 relative to the match temperature, and may generate a temperature signal 128 representative of the temperature increase. The temperature sensor 126 may be a thermocouple, a resistance temperature detector, a pyrometer measuring thermal radiation, or other contact or non-contact temperature sensor. The light source, upon receiving the temperature signal 128, may change (e.g., increase or decrease) the intensity (e.g., magnitude) and/or the wavelength of the emitted light 182 in a manner that alters the excitation level of the photosensitive chromophores 150 to change the matrix refractive index 202 so that the matrix refractive index 202 is altered to substantially match (e.g., within approximately 10 percent) the fiber refractive index 200 such that the optical transparency of the composite structure 102 may be maintained despite the thermally-induced change in the matrix refractive index 202.

Similarly, the composite structure 102 may include one or more strain sensors 130 such as strain gauges mounted to one or more of the outer surfaces 106 of the composite structure 102 and/or embedded within the composite structure 102. The strain sensors 130 may be configured to measure or sense changes in mechanical strain of the composite structure 102. The strain sensors 130 may generate a strain signal 132 that may be transmitted to the light source, and causing the light source 180 to adjust or change the intensity and/or wavelength of the emitted light 182 in a manner to alter the excitation level of the light-reactive material 148 and/or the chromophores 150 so that the matrix refractive index 202 is altered to substantially match the fiber refractive index 200 and thereby compensate or adjust for strain-induced change in the matrix refractive index 202. In a further embodiment, the system 100 may include an optical sensor configured to measure optical transparency the composite structure 102, and may transmit a signal to the light source 180 to cause the light source 180 to adjust the intensity and/or wavelength of the emitted light 182 to maintain a baseline transparency level.

In some examples, the sensors and/or light source 180 may cooperate to cause the light source 180 to emit light 182 of a luminous intensity that varies in proportion to temperature change of the composite structure 102 and in a manner causing a proportional change in the matrix refractive index 202. For example, the light source 180 may be configured to emit light 182 of increasing intensity in proportion to an increase in the temperature of the composite structure 102, and thereby inducing a reaction in the light-reactive material 148 and/or the chromophores 150 that causes a proportional decrease in the matrix refractive index 202 to substantially match a thermally-induced decrease in the fiber refractive index 200. Conversely, the light source 180 may emit light 182 of decreasing intensity in proportion to a decrease in the temperature of the composite structure 102 to cause, via the light-reactive material 148 and/or the chromophores 150, a proportional increase in the matrix refractive index 202.

In some examples, the fibers 116 and the matrix 114 may be individually optically transparent within a wavelength band of interest such as the infrared spectrum and/or visible spectrum. However, the fibers 116 and the matrix 114 may have non-matching refractive indices at a given temperature (e.g., room temperature) or temperature range within the infrared and/or visible spectrum. When the fibers 116 are embedded within the matrix 114 in a composite structure 102 with light-reactive material 148 and/or chromophores 150 included in the matrix 114 and/or the fibers 116, the light source 180 may be activated at any point during operation of the system 100 to cause a reaction in the light-reactive material 148 and/or the chromophores 150 as a means to adjust the matrix refractive index 202 to substantially match the fiber refractive index 200 at one or more operating temperatures such that the composite structure 102 becomes substantially optically transparent. The light source 180 may modulate the emitted light 182 based on feedback from one or more sensors 126, 130 sensing the temperature or strain of the composite structure 102 so that the light source 180 may adjust the intensity and/or wavelength of emitted light 182 to cause a reaction in the light-reactive material 148 and/or the chromophores 150 in such a manner that the matrix refractive index 202 is adjusted to be substantially equivalent to the fiber refractive index 200 at that temperature of the composite structure 102.

FIG. 4 is a non-limiting example of a chromophore 150 configured as an azobenzene 152 molecule. The left-hand side of FIG. 4 illustrates the azobenzene 152 molecule in an unactivated state 160 or trans state 154. The right-hand side of FIG. 4 illustrates the azobenzene 152 molecule in an activated state 158 or cis state 156. The azobenzene 152 molecule may transition from the trans state 154 to the cis state 156 photo-chemically as a result of the light 182 emitted by the light source 180. The azobenzene 152 molecule may revert back to the trans state 154 thermally. The azobenzene 152 molecule may induce a change in the refractive index of a polymer matrix of approximately 0.3 at a wavelength of 633 nm. Other chromophore 150 configurations may be implemented for the system 100 and method disclosed herein. For example, in addition to the above-described azobenzene 152 molecule, the chromophores 150 may be provided as coumarin, phenyl, norbornadiene, and derivatives thereof. Norbornadiene groups may induce a change in the refractive index of polymer matrix 114 of approximately 0.01 at a wavelength of 633 nm.

Although the figures in the present application schematically represent the light-reactive material 148 and/or the chromophores 150 as individual particles, the system 100 and method disclosed herein may include light-reactive material 148 and/or chromophores 150 provided as a non-reactive composition substantially uniformly dispersed within the matrix 114 and/or within the fibers 116 themselves. In one example, light-reactive material 148 and/or chromophores 150 may be pre-reacted with the matrix 114 constituents of an epoxy, such as an epoxy amine system. Alternatively, light-reactive material 148 and/or chromophores 150 may be provided in a ring configuration having a reactive group that is configured to react with a backbone of the polymer matrix 114. In some examples, a chromophore 150 may be covalently bonded into the matrix 114. In the present disclosure, a light-reactive material 148 and/or a chromophore 150 may be described as any group of atoms that react in the presence of light of a given wavelength or wavelength band, and induce a change in the refractive index of a polymer matrix 114 containing the light-reactive material 148 and/or chromophores 150.

A composite structure 102 may include a matrix 114 containing more than one type of light-reactive material 148 and/or chromophores 150. For example, the matrix 114 may include a first chromophore type 162 (FIG. 3) and a second chromophore type 164 (FIG. 3). The first chromophore type 162 may be configured to photo-induce a change in the matrix refractive index 202 in response to a first activation wavelength 188 emitted by the light source 180 such that the first activation wavelength 188 is incident on the first chromophore type 162. The second chromophore type 164 may be configured to photo-induce a change in the matrix refractive index 202 in response to a second activation wavelength 188 emitted by the light source 180 incident on the second chromophore type 164. For example, the first activation wavelength 188 may cause the first chromophore type 162 to photo-induce a transition in the matrix refractive index 202 from an unactivated matrix refractive index up to a first matrix refractive index (not shown). The second activation wavelength 188 may cause the second chromophore type 164 to photo-induce a further transition (e.g., an increase or a decrease) in the matrix refractive index 202 from the first matrix refractive index to a second matrix refractive index (not shown).

In some examples, the light source 180 and the light-reactive material 148 and/or chromophores 150 may cooperate to change or adjust the matrix refractive index 202 in a manner to alter or maintain the Abbe number of the matrix 114 during environmentally-induced changes in the fiber refractive index 200. In the present disclosure, the Abbe number may be described as a number that represents the change in refractive index of a material as a function of the measurement wavelength. In this regard, the Abbe number may represent the amount of curvature of a plot of the refractive index (n) of a material vs. wavelength ($\lambda$). A material with a high Abbe number may undergo relatively small changes in refractive index with changes in wavelength (e.g., relatively small curvature in the plot of refractive index vs. wavelength). In contrast, a material with a low Abbe number may undergo relatively large changes in refractive index with changes in wavelength (e.g., more curvature in the plot of refractive index vs. wavelength).

The system 100 and method of the present disclosure may be configured such that the light source 180 and the light-reactive material 148 and/or chromophores 150 cooperate to change or adjust the matrix refractive index 202 to maintain the Abbe number of the matrix 114 such that the fiber and matrix refractive indices 200, 202 are maintained within a predetermined difference of one another across a wavelength band of interest for a given temperature or temperature range. In one example, the light-reactive material 148 and/or chromophores 150 may be specifically chosen to be included in the composite structure 102 for initial activation and/or further excitation by a light source 180 which may be operated in a manner to change or adjust the matrix refractive index 202 to maintain the Abbe number of the matrix 114 such that the fiber and matrix refractive indices 200, 202 are maintained within 3 percent and, more preferably, within 0.1 percent of one another across a wavelength band of interest (e.g., across the infrared and/or visible spectrum) for a given temperature range (e.g., −65° F. to 220° F.).

Figure 5:
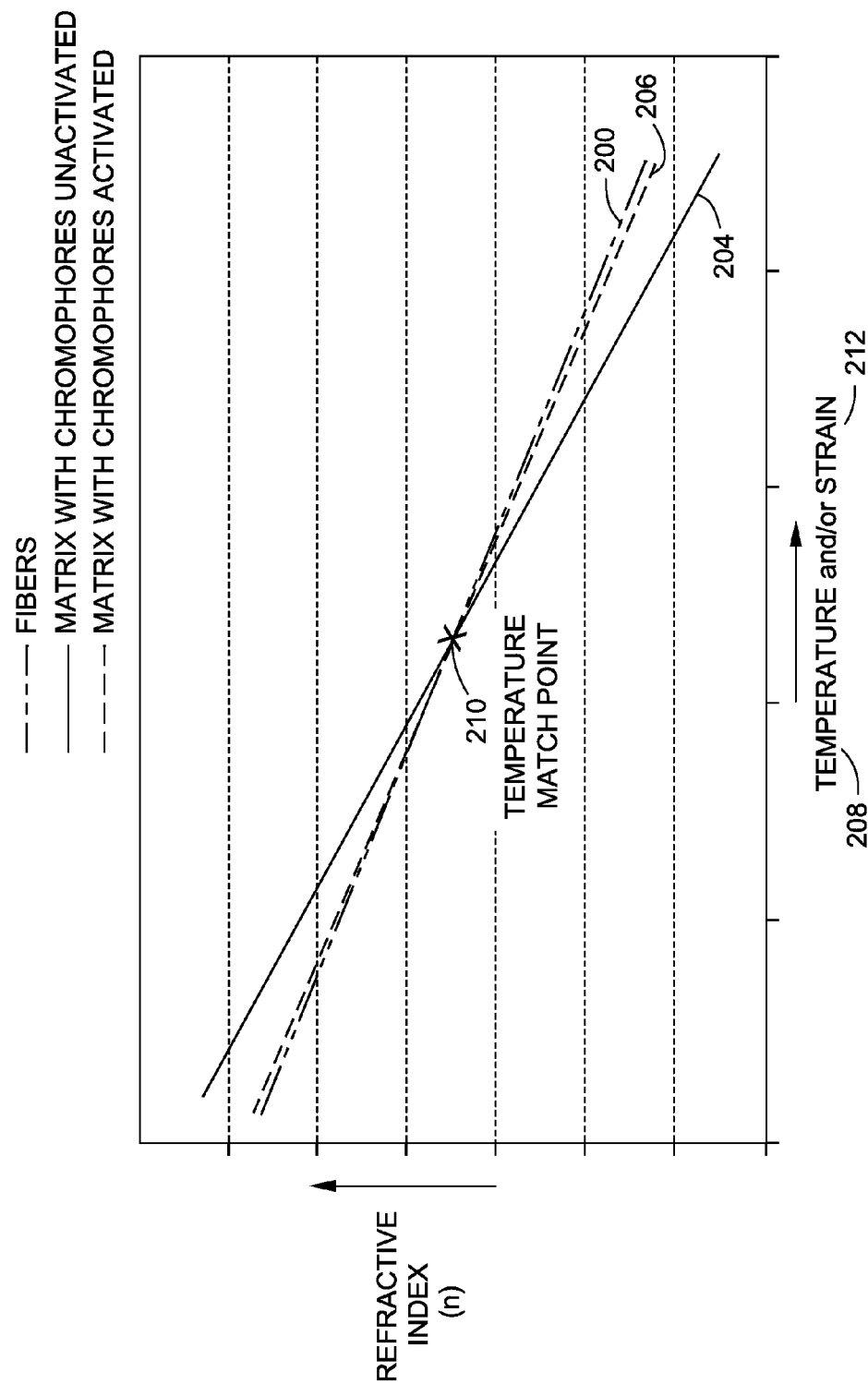
FIG. 5 is a graph of refractive index at a given wavelength versus temperature and illustrating a mismatch between the refractive indices of the matrix and fibers with changing temperature when the chromophores are unactivated, and further illustrating the more closely matched refractive indices of the matrix and fibers when the chromophores are activated.

FIG. 5 is a graph of refractive index at a given wavelength versus temperature and/or strain for fiber material (shown as a phantom line 200) and for polymer matrix material (shown as a solid line and as a dashed line). The solid line 204 represents the refractive index of the polymer matrix material with the chromophores unactivated. The dashed line 206 represents the refractive index of the polymer matrix material with the chromophores activated. In the example shown, the refractive indices of the fibers and the matrix are identical for at least one match point temperature 210 within the wavelength band of interest, as represented by the intersection of the refractive index curves of the matrix and the fibers. As can be seen, the refractive indices of the fibers and matrix decrease with increasing temperature and/or increasing mechanical strain in the composite structure. FIG. 5 illustrates the mismatch between the refractive indices of the fiber material (phantom line 200) and the matrix with light-reactive material 148 and/or chromophores 150 unactivated (solid line 204) as the temperature changes. However, FIG. 5 illustrates the substantial matching of the refractive indices of the fiber material (phantom line 200) and the matrix with light-reactive material 148 and/or chromophores 150 being proportionally activated (dashed line 206) in response to changes in temperature or strain, as may be achieved by emitting light 182 (FIG. 3) of an activation wavelength 188 (FIG. 3) from a light source 180 (FIG. 3) toward the composite structure 102 (FIG. 3).

FIG. 6 is a sectional view of a system 100 containing a first light source 184 and a second light source 190. The first light source 184 is shown emitting light 182 of a first wavelength 186 toward a side edge 112 of the composite structure 102, and the second light source 190 is not emitting any light. The first wavelength 186 emitted by the first light source 184 may be an activation wavelength 188 that may induce a reaction in the light-reactive material 148 and/or chromophores 150 causing a change in the matrix refractive index 202 in one direction. For example, the activation wavelength 188 may cause a decrease in the matrix refractive index 202 as a means to match a thermally-induced decrease in the fiber refractive index 200 caused by an increase in the temperature of the composite structure 102. In another example, the activation wavelength 188 may cause an increase in the matrix refractive index 202 as a means to match a thermally-induced increase in the fiber refractive index 200 caused by a decrease in the temperature of the composite structure 102.

FIG. 7 is a sectional view of the system 100 illustrating the second light source 190 emitting light 182 of a second wavelength 192 toward a side edge 112 of the composite structure 102, and the first light source 184 is not emitting any light. The second wavelength 192 emitted by the second light source 190 may be a deactivation wavelength 194 configured to induce a reaction in the light-reactive material 148 and/or chromophores 150 causing a change in the matrix refractive index 202 in a direction opposite the change induced by the activation wavelength 188 emitted by the first light source 184. In some examples, the second light source 190 may be configured to emit the second wavelength 192 to completely reverse the refractive index change induced in the matrix 114 by the first light source 184. In other examples, the second wave length may only partially reverse the refractive index change induced in the matrix 114 by the first light source 184.

In still other examples, the light-reactive material 148 and/or chromophores 150 may naturally revert to an unactivated state 160 without photo-inducement by a deactivation wavelength 194. For example, the chromophores 150 in the matrix 114 may partially or completely revert to an unactivated state 160 due to thermal motions when the activation wavelength 188 is removed from the chromophores 150. Removal of the activation wavelength 188 may cause a change in the matrix refractive index 202 in a direction opposite the change induced by the activation wavelength 188. In still further examples, the light-reactive material 148 and/or chromophores 150 may naturally revert to an unactivated state 160 by bringing the composite structure 102 up to an elevated temperature, and without photo-inducement by a deactivation wavelength 194. In this regard, the temperature of a composite structure 102 with activated chromophores 150 may be increased and held for a predetermined time period until the chromophores 150 are partially or completely deactivated and/or the matrix refractive index 202 changes (e.g., decreases) by a desired amount.

FIG. 8 is a sectional view of an example of a system 100 wherein a composite structure 102 includes a coating 108 on the outer surfaces 106 of the composite structure 102. In the example shown, a coating 108 may be applied to an entirety of both of the opposing outer surfaces 106 bounded by the side edges 112 of the panel 104. Each coating 108 may have a refractive index configured to reflect the inducing wavelengths including activation wavelengths 188 and/or deactivation wavelengths 194 that may be emitted by one or more light sources 180 toward one or more side edges 112 of the composite structure 102. The coating 108 may allow the transmission of ambient light 122 through the outer surfaces 106 of the composite structure 102. The coating 108 may be configured to internally reflect the inducing wavelengths of light emitted by the light source 180 and transmitted along a length and/or width of an interior of the composite structure 102. In this regard, a coating 108 may act as a waveguide to contain the light 182 emitted from the light source 180 and transmitted through the interior of the composite structure 102, and thereby prevent the passage of the emitted light 182 through the outer surface 106 of the composite structure 102 which may otherwise be observed as a glow emanating from an interior of the composite structure 102.

Although FIG. 8 illustrates a coating 108 on both of the opposing outer surfaces 106, a composite structure 102 may include a coating 108 on only one outer surface 106, or the coating 108 may be applied to only a portion of one or more outer surfaces 106 of the composite structure 102. In the present disclosure, the term coating 108 may include any type of surface treatment, solution, film, layer, sheet, or other coating material that may be applied to or disposed or mounted on or adjacent to one or more outer surfaces 106 of a composite structure 102 to internally reflector or waveguide the inducing (e.g., activation and/or deactivation) wavelengths of light 182 emitted by a light source 180. In addition, a coating 108 may be included within other layers (not shown) that may be applied to one or more outer surfaces 106 of a composite structure 102 to provide different functionalities such as glare reduction, water repellency, and other functionalities.

In some examples, the wavelengths emitted by the light source 180 for influencing, exciting, activating, or deactivating the light-reactive material 148 and/or chromophores 150 may be outside of the visible spectrum and/or outside of the infrared spectrum. For example, the wavelength or wavelength bands emitted by the light source 180 may be within the ultraviolet (UV) spectrum for a system 100 intended for use in an environment where the ambient light 122 is in the visible spectrum and/or infrared spectrum. However, it is contemplated that one or more of the wavelengths emitted by the light source 180 may be within the spectrum of the ambient light 122.

FIG. 9 is a sectional view of a system 100 wherein the composite structure 102 includes a filter 110 on the outer surfaces 106 of the composite structure 102. The filter 110 may be configured to prevent certain ambient wavelengths 124 of ambient light 122 from entering the composite structure 102 and activating the light-reactive material 148 and/or chromophores 150. In this regard, a filter 110 on an outer surface 106 of a composite structure 102 may be configured to block, reflect, absorb, or otherwise prevent ambient wavelengths 124 that are near or at the activation wavelength 188 or deactivation wavelength 194 from entering the composite structure 102 and unintentionally activating or deactivating the chromophores 150. The filter 110 may prevent the passage of such activation and/or deactivation wavelengths 188, 194 in the ambient light 122 through the outer surface 106 and prevent entry into the interior of the composite structure 102. In this regard, the activation or deactivation wavelengths 188, 194 of light may be filtered from the outer surfaces 106 of a composite structure 102, while the remaining wavelengths in the ambient light 122 may pass through the filters 110.

Figure 10:
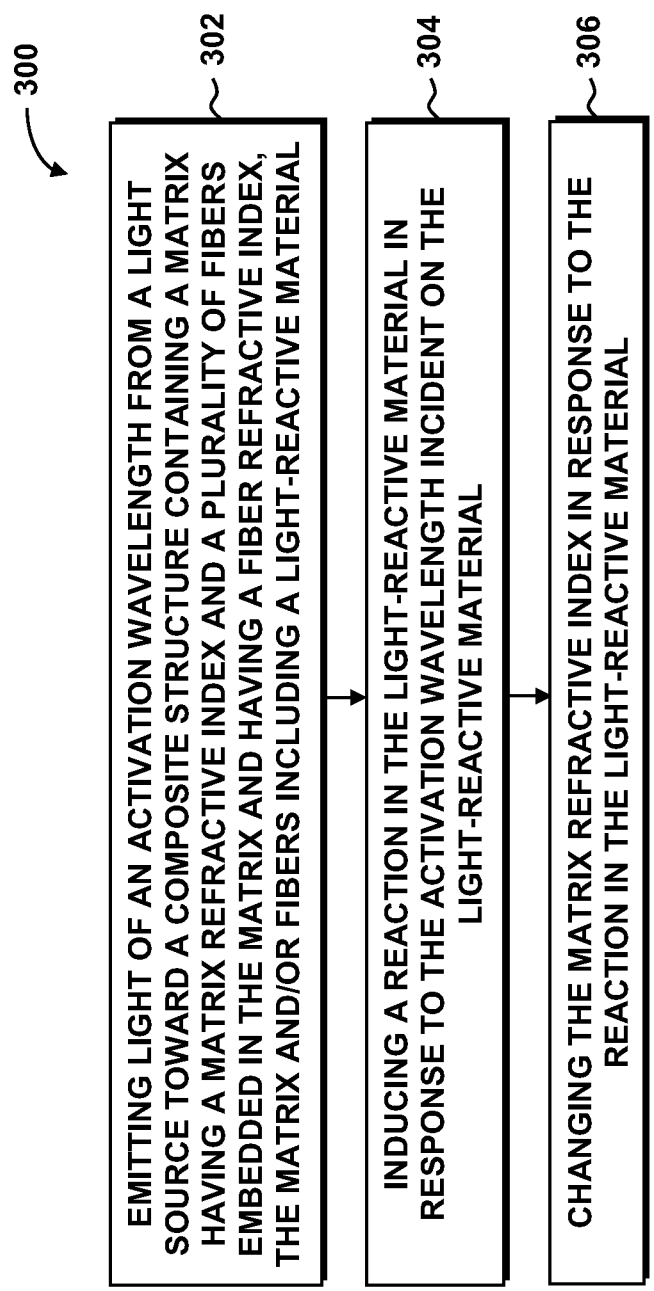
FIG. 10 is an illustration of a flowchart of one or more operations of a method of adjusting the refractive index of a matrix of a composite structure.

FIG. 10 is an illustration of a flowchart including one or more operations that may be performed in a method 300 of adjusting the refractive index of a matrix 114 of a composite structure 102. As indicated above, the matrix 114 may have a matrix refractive index 202 and a plurality of fibers 116 embedded in the matrix 114. The fibers 116 may have a fiber refractive index 200. The matrix 114 may include one or more types of light-reactive material 148 and/or chromophores 150. The matrix 114 and the fibers 116 may be substantially optically transparent in the visible spectrum and/or the infrared spectrum such that ambient light 122 may pass through the composite structure 102. In some examples, the matrix refractive index 202 may be substantially equivalent (e.g., within 10 percent) to the fiber refractive index 200 at a given wavelength for at least one temperature prior to activation of the light-reactive material 148 and/or chromophores 150. In other examples, the refractive indices of the matrix 114 and fibers 116 may be initially (e.g., prior to activating the chromophores 150) non-matching for any wavelength band for an operating temperature range of the composite structure 102.

Step 302 of the method may include emitting light 182 of an activation wavelength 188 from a light source 180. The light source 180 may emit light 182 toward one or more side edges 112 of the composite structure 102 as indicated above such that the light 182 impinges on the light-reactive material 148 and/or chromophores 150 within the composite structure 102. Light 182 may be emitted from the light source 180 in response to applying power to the light source 180. Alternatively, light 182 from a currently activated light source 180 may by directed toward the side edge 112 of the composite structure 102. As indicated above, the light source 180 may be a light emitting diode, a laser, or other light source configuration. The emitted light 182 from the light source 180 may be of an activation wavelength 188 that is outside of the infrared and/or the visible spectrum. For example, the activation wavelength 188 may be in the ultraviolet spectrum.

Step 304 of the method may include inducing a reaction in the chromophores 150 in response to the activation wavelength 188 incident on the chromophores 150. As indicated above, impingement of one or more wavelengths from the light source 180 upon the light-reactive material 148 and/or chromophores 150 may cause the light-reactive material 148 and/or chromophores 150 to transition from an unactivated state 160 to an activated state 158. In some examples, light 182 from the light source 180 may be configured to further excite currently-activated light-reactive material 148 and/or chromophores 150 to effectuate a further change in the matrix refractive index 202. In still other examples, light 182 from a light source 180 may be configured to partially or completely deactivate the light-reactive material 148 and/or chromophores 150 as a means to partially or completely reverse the matrix refractive index 202 change induced by an activation wavelength 188 emitted by a light source 180.

Step 306 of the method may include changing the matrix refractive index 202 in response to the reaction induced in the light-reactive material 148 and/or chromophores 150 in response to the light 182 from a light source 180 impinging on the chromophores 150. In some examples, the method may include emitting one or more activation wavelengths 188 from the light source 180 in a manner such that the light-reactive material 148 and/or chromophores 150 maintain the matrix refractive index 202 within approximately 10 percent of the fiber refractive index 200 within a wavelength band of interest such as within the infrared and/or the visible spectrum. In one example, the light source 180 may be configured to emit one or more wavelengths in such a manner that the chromophores 150 maintain the matrix refractive index 202 within approximately 3 percent, and preferably within approximately 0.1 percent of the fiber refractive index 200 within the visible spectrum for a temperature range of from approximately −65° F. to approximately 220° F. In a further example, the step of changing the refractive index of the matrix 114 may include using specifically selected chromophores 150, and modulating the light 182 emitted by the light source 180 in a manner to change or adjust the matrix refractive index 202 to maintain the Abbe number of the matrix 114 during environmentally-induced changes in the fiber refractive index 200. For example, the light source 180 may emit light 182 in a manner to adjust the matrix refractive index 202 to maintain the Abbe number of the matrix 114 within approximately 10 percent of the Abbe number of the fibers 116 during environmentally-induced changes in the fiber refractive index 200.

The matrix refractive index 202 may be adjusted by adjusting, modulating, or changing the luminous intensity of light 182 emitted by the light source 180 in proportion to environmentally-induced changes in the composite structure 102. For example, the intensity of light 182 emitted by the light source 180 may be changed in proportion to changes in temperature of the composite structure 102. The method may further include changing the matrix refractive index 202 in proportion to changes in the intensity of light 182 emitted by the light source 180 as a means to maintain the matrix refractive index 202 within a predetermined range of the fiber refractive index 200 of the composite structure 102. For example, the light source 180 may emit light 182 of increasing intensity in proportion to an increase in the temperature of the composite structure 102 to cause a proportional change in the matrix refractive index 202.

The method may also include emitting from the light source 180 a deactivation wavelength 194 toward the activated light-reactive material 148 and/or chromophores 150 in the composite structure 102. The method may additionally include inducing, using the deactivation wavelength 194, a reaction in the light-reactive material 148 and/or chromophores 150 causing a change in the matrix refractive index 202 in a direction opposite the change induced by the activation wavelength 188. For example, the activation wavelength 188 may photo-induce the light-reactive material 148 and/or chromophores 150 to cause a reduction in the matrix refractive index 202. The deactivation wavelength 194 may be emitted as a means to reverse the effect of the activation wavelength 188 by causing an increase in the matrix refractive index 202.

In some examples, the effect of the activation wavelength 188 may be at least partially reversed by removing the activation wavelength 188 from the chromophores 150, and naturally reverting the light-reactive material 148 and/or chromophores 150 to an unactivated state 160 due to thermal motion when the activation wavelength 188 is removed from the light-reactive material 148 and/or chromophores 150. In this regard, the light-reactive material 148 and/or chromophores 150 may revert to an unactivated state 160 without a deactivation wavelength 194. In this manner, the light-reactive material 148 and/or chromophores 150 may at least partially return to their unactivated state 160 after removal of the activation wavelength 188. In still other examples, the method may include removing the activation wavelength 188 from the light-reactive material 148 and/or chromophores 150, elevating the temperature of the composite structure 102, and naturally reverting the light-reactive material 148 and/or chromophores 150 to the unactivated state 160 in response to elevating the temperature of the composite structure 102, as indicated above.

Changes to the matrix refractive index 202 may be initiated in response to sensor input provided by one or more environmental sensors of the composite structure 102. For example, the method may include sensing at least one environmental parameter of the composite structure 102, transmitting to the light source 180 a sensor signal representative of the parameter, and regulating, based on the sensor signal, the light source 180 to cause the light source 180 to emit light 182 in a manner that induces a reaction in the light-reactive material 148 and/or chromophores 150 to change the matrix refractive index 202 by an amount that maintains a same level of optical transparency of the composite structure 102 relative to a baseline transparency level. The baseline transparency may be the level of transparency of the composite structure 102 at room temperature or other temperature, and/or at zero strain on the composite structure 102.

The output of the light source 180 may be regulated to adjust the luminous intensity of the light 182 emitted by the light source 180 based upon one or more sensor signals representative of the environmental state of the composite structure 102. For example, the method may include sensing, using a temperature sensor 126, a temperature change of the composite structure 102, transmitting a temperature signal 128 to the light source, and regulating, based on the temperature signal 128, the light source 180 such that the light source 180 emits the wavelength of light 182 in a manner that induces the reaction in the light-reactive material 148 and/or chromophores 150 by an amount altering the matrix refractive index 202 to compensate or adjust for the thermally-induced change in the fiber refractive index 200. In another example, the method may include sensing a change in the mechanical strain of the composite structure 102, transmitting a strain signal 132 to the light source, and regulating, based on the strain signal 132, the light source 180 to emit the wavelength of light 182 in a manner that induces the reaction in the light-reactive material 148 and/or chromophores 150 by an amount altering the matrix refractive index 202 to compensate for a strain-induced change in the matrix refractive index 202.

As shown in FIG. 8, one or more outer surfaces 106 of the composite structure 102 may include a coating 108. The method may include emitting light 182 from the light source 180 toward the light-reactive material 148 and/or chromophores 150 in the composite structure 102, and internally reflecting, using the coating(s) 108, the emitted light 182 along a length and/or width of the composite structure 102. A coating 108 may have a refractive index preventing transmission of the emitted light 182 through the outer surface 106 due to internal reflection of the emitted light 182. For a panel 104 having a pair of opposing outer surfaces 106 each having coatings 108, the coatings 108 may internally reflect and contain the emitted light 182 between the opposing outer surfaces 106, and may thereby prevent transmission of the emitted light 182 out of the composite structure 102 through the outer surfaces 106.

As shown in FIG. 8, one or more outer surfaces 106 of the composite structure 102 may include a filter 110. The method may include subjecting the composite structure 102 to ambient light 122 (e.g., sunlight, moonlight, shop light, etc.) containing the activation wavelength 188, and preventing, using the filter 110, the activation wavelength 188 from passing through the outer surface 106 and entering an interior of the composite structure 102 as a means to avoid activation of the light-reactive material 148 and/or chromophores 150 by ambient light 122. In this regard, any activation wavelength 188 that may be present in ambient light 122 may be filtered from the outer surfaces 106 of the composite structure 102 such that ambient light 122 does not activate the chromophores 150.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A system, comprising:
    a composite structure, including:
        a matrix having a matrix refractive index;
        a plurality of reinforcing fibers within the matrix and having a fiber refractive index;
        a light-reactive material in the matrix and/or the fibers;
    a light source capable of emitting light of an activation wavelength that induces a reaction in the light-reactive material causing a change in the matrix refractive index;
    at least one of a temperature sensor, a strain sensor, and a transparency sensor configured to respectively sense temperature, mechanical strain, and optical transparency of the composite structure and transmit to the light source a sensor signal representative thereof; and
    the light source configured to regulate, based on the sensor signal, a non-zero intensity of the light and/or a wavelength of the non-zero intensity light in a manner inducing the reaction in the light-reactive material to alter the matrix refractive index by an amount that at least partially compensates for at least one of thermally-induced change and strain-induced change in the matrix refractive index.

2. The system of claim 1 wherein:
    the matrix and the fibers are substantially optically transparent in an infrared spectrum and/or a visible spectrum.

3. The system of claim 1 wherein:
    the light source is configured to emit one or more wavelengths in a manner maintaining the matrix refractive index within approximately 3 percent of the fiber refractive index within a wavelength band of interest.

4. The system of claim 1 wherein:
    the light-reactive material and the light source cooperating to change the matrix refractive index in a manner altering or maintaining an Abbe number of the matrix during environmentally-induced changes in the fiber refractive index.

5. The system of claim 1, further including:
    a coating on at least one outer surface of the composite structure; and
    the coating having a refractive index configured to internally reflect incident light from the light source toward a side edge of the composite structure.

6. The system of claim 1, further including:
    a filter on at least one outer surface of the composite structure and configured to prevent ambient light of the activation wavelength from passing through the outer surface and entering an interior of the composite structure.

7. The system of claim 1 wherein:
    the light-reactive material is a photosensitive chromophore.

8. The system of claim 7 wherein:
    the chromophore is one of the following: norbornadiene, azobenzene, coumarin, and phenyl, and derivatives thereof.

9. The system of claim 1 wherein:
    the wavelength emitted by the light source is outside of a visible spectrum.

10. The system of claim 1 wherein:
    the light source is configured to emit an activation wavelength and a deactivation wavelength;
    the activation wavelength inducing a reaction in the light-reactive material causing a change in the matrix refractive index in one direction; and
    the deactivation wavelength inducing a reaction in the light-reactive material causing a change in the matrix refractive index in a direction opposite the change induced by the activation wavelength.

11. The system of claim 1 wherein:
    the wavelength inducing a reaction in the light-reactive material into an activated state causing a change in the matrix refractive index in one direction; and
    the light-reactive material naturally reverting to an unactivated state due to thermal motion when the activation wavelength is removed and causing a change in the matrix refractive index in a direction opposite the change induced by the activation wavelength.

12. The system of claim 11 wherein:
    the light-reactive material naturally reverting to the unactivated state when the activation wavelength is removed and the composite structure is brought up to an elevated temperature.

13. The system of claim 1 further including:
    the light source regulating, based on the sensor signal, the light in a manner maintaining approximately a same level of optical transparency of the composite structure relative to a baseline transparency level of the composite structure.

14. A system, comprising:
    a composite panel having opposing outer surfaces and a side edge, including:
        a substantially optically-transparent matrix having a matrix refractive index;
        a plurality of substantially optically-transparent reinforcing fibers within the matrix;
        a photosensitive chromophore in the matrix and/or the fibers;
    a light source capable of emitting emitted light of a wavelength onto the side edge, the wavelength inducing a reaction in the chromophore causing a change in the matrix refractive index;
    at least one of a temperature sensor and a strain sensor configured to respectively sense temperature and mechanical strain of the composite panel and transmit to the light source a sensor signal representative thereof; and
    the light source configured to regulate, based on the sensor signal, a non-zero intensity of the light and/or a wavelength of the non-zero intensity light in a manner inducing the reaction in the photosensitive chromophore to alter the matrix refractive index by an amount that at least partially compensates for at least one of thermally-induced change and strain-induced change in the matrix refractive index.

15. A method of adjusting a refractive index of a matrix of a composite structure, comprising the steps of:
emitting light of an activation wavelength from a light source toward a composite structure and containing a matrix having a matrix refractive index and a plurality of reinforcing fibers within the matrix and having a fiber refractive index, the fibers and/or the matrix including a light-reactive material;
inducing a reaction in the light-reactive material in response to the activation wavelength that is incident on the light-reactive material;
changing the matrix refractive index in response to the reaction in the light-reactive material;
sensing, using a sensor, at least one of temperature, mechanical strain, and optical transparency of the composite structure;
transmitting to the light source a sensor signal representative of at least one of the temperature, mechanical strain, and optical transparency; and
regulating, based on the sensor signal, the light source to emit adjust a non-zero intensity of the light and/or a wavelength of the non-zero intensity light in a manner inducing the reaction in the light-reactive material to alter the matrix refractive index by an amount that at least partially compensates for at least one of thermally-induced change and strain-induced change in the matrix refractive index.

16. The method of claim 15 wherein:
the light-reactive material is a photosensitive chromophore.

17. The method of claim 15 wherein the step of emitting light comprises:
emitting one or more activation wavelengths in a manner such that the light-reactive material maintains the matrix refractive index within approximately 3 percent of the fiber refractive index within a wavelength band of interest.

18. The method of claim 17 wherein:
the wavelength band of interest is an infrared spectrum and/or a visible spectrum.

19. The method of claim 15 further comprising the step of:
emitting light of an activation wavelength that is outside of a visible spectrum.

20. The method of claim 15 wherein:
the matrix and the fibers are substantially optically transparent in an infrared spectrum and/or a visible spectrum.

21. The method of claim 15 wherein an outer surface of the composite structure includes a coating, the method further including:
emitting the light onto a side edge of the composite structure;
internally reflecting, using the coating, the light along a length and/or width of the composite structure; and
preventing transmission of the light through the outer surface due to internal reflection of the light.

22. The method of claim 15 wherein an outer surface of the composite structure includes a filter, the method further including:
subjecting the composite structure to ambient light containing the activation wavelength; and
preventing, using the filter, the activation wavelength from passing through the outer surface and entering an interior of the composite structure.

23. The method of claim 15 further comprising the step of:
adjusting, using the light-reactive material and the light source, the matrix refractive index in a manner altering or maintaining an Abbe number of the matrix during environmentally-induced changes in the fiber refractive index.

24. The method of claim 15 further including:
emitting from the light source a deactivation wavelength; and
inducing, using the deactivation wavelength, a reaction in the light-reactive material causing a change in the matrix refractive index in a direction opposite the change induced by the activation wavelength.

25. The method of claim 15 further including:
removing the activation wavelength from the light-reactive material; and
naturally reverting the light-reactive material to an unactivated state due to thermal motion when the activation wavelength is removed from the light-reactive material.

26. The method of claim 15 further including:
removing the activation wavelength from the light-reactive material;
elevating a temperature of the composite structure; and
naturally reverting the light-reactive material to an unactivated state in response to elevating the temperature of the composite structure.

27. The method of claim 15 further including:
regulating, based on the sensor signal, the light source in a manner causing the light source to adjust the light in a manner that maintains a same level of optical transparency of the composite structure relative to a baseline transparency level of the composite structure.

* * * * *